(12) United States Patent
Baroncini

(10) Patent No.: US 9,382,024 B2
(45) Date of Patent: Jul. 5, 2016

(54) DISTRIBUTOR UNIT

(71) Applicant: I.M.A. Industria Macchine Automatiche S.P.A., Ozzano Dell' Emilia (IT)

(72) Inventor: Ivano Baroncini, Castel San Pietro Terme (IT)

(73) Assignee: I.M.A. INDUSTRIA MACCHINE AUTOMATICHE S.P.A., Ozzano Dell' Emilia (IT)

( * ) Notice: Subject to any disclaimer, the term of this patent is extended or adjusted under 35 U.S.C. 154(b) by 0 days.

(21) Appl. No.: 14/384,984

(22) PCT Filed: Mar. 14, 2013

(86) PCT No.: PCT/IB2013/000383
§ 371 (c)(1),
(2) Date: Sep. 12, 2014

(87) PCT Pub. No.: WO2013/136162
PCT Pub. Date: Sep. 19, 2013

(65) Prior Publication Data
US 2015/0027851 A1    Jan. 29, 2015

(30) Foreign Application Priority Data

Mar. 14, 2012  (IT) .............................. MI2012A0398

(51) Int. Cl.
*B65B 35/28* (2006.01)
*B65G 47/14* (2006.01)
*B65B 9/04* (2006.01)
*B65B 5/10* (2006.01)

(52) U.S. Cl.
CPC ............ *B65B 35/28* (2013.01); *B65G 47/1492* (2013.01); *B65B 5/103* (2013.01); *B65B 9/045* (2013.01); *B65G 2201/027* (2013.01)

(58) Field of Classification Search
CPC ........ B65B 35/28; B65B 9/045; B65B 5/103; B65B 35/12; B65G 47/1492; B65G 2201/027; B65G 11/20; B65G 11/203; B65G 47/14; B65G 45/22
USPC ........................... 198/493, 525–533; 221/278
See application file for complete search history.

(56) References Cited

U.S. PATENT DOCUMENTS

| 4,627,225 | A  | * | 12/1986 | Faller et al. ...................... 53/510 |
| 6,311,743 | B1 | * | 11/2001 | Baroncini ....................... 141/234 |
| 6,681,550 | B1 | * | 1/2004  | Aylward .......................... 53/473 |
| 7,134,460 | B2 | * | 11/2006 | Kaplan et al. ................. 141/200 |
| 7,516,836 | B2 |   | 4/2009  | Trygar et al. |
| 2004/0035878 | A1 | * | 2/2004  | Aylward ........................ 221/303 |

FOREIGN PATENT DOCUMENTS

| EP | 2441682 A1 * | 4/2012 | ............... B65B 9/04 |
| FR | 1055615 | 2/1954 |
| FR | 2759668 | 8/1998 |

* cited by examiner

*Primary Examiner* — Mark A Deuble
(74) *Attorney, Agent, or Firm* — Hamre, Schumann, Mueller & Larson, P.C.

(57) ABSTRACT

A distributor unit, suitable to distribute tablets, comprises an aligner channel cooperating with a transfer channel having an entrance zone. Feed means are associated to said transfer channel in order to work on the tablets.

15 Claims, 4 Drawing Sheets fig. 1 (State of the art)

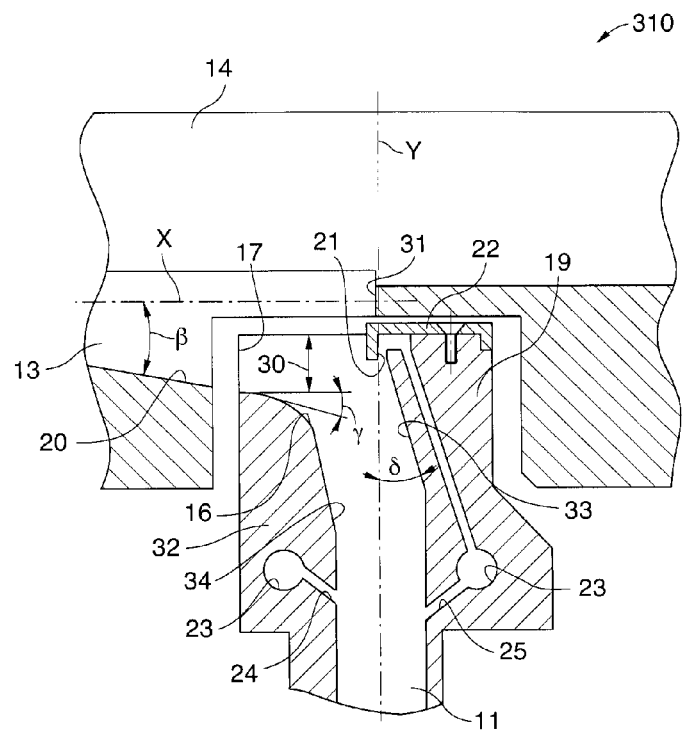
fig. 4
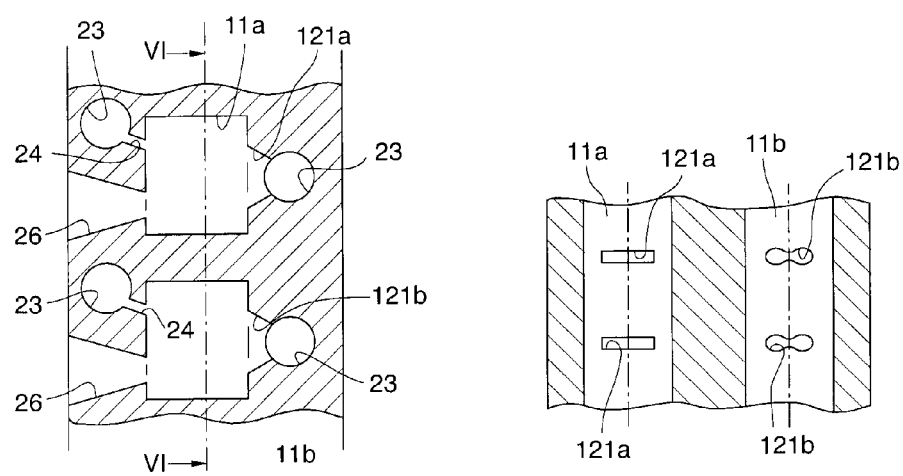
fig. 5
fig. 6

DISTRIBUTOR UNIT

FIELD OF THE INVENTION

The present invention concerns a distributor unit able to transfer continuously products such as tablets, pills, capsules or other similar or comparable product, from a supply element, such as a collecting basin or a vibrating selector, which contains then in random manner, to a subsequent user device, that is, organized containing means, such as a blister strip, where they are disposed tidily and in at least one row in suitable blisters or seatings.

In particular, the present invention concerns the gripping by a transfer channel of a tablet, pill or capsule, or similar products, which here and hereafter in the description and claims will be indicated by the term tablets, and the sending thereof to the exit of said transfer channel.

BACKGROUND OF THE INVENTION

Transfer channels are known, as used in the field for packaging finished products, such as tablets, for pharmacological, health or food purposes.

It is also known that known transfer channels have limited productivity objectives, in terms of tablets per unit of time which can transit in the channels.

It is also known that the transfer channels are normally coupled in a considerable number, in order to be able to increase the productivity of the distributor unit in which they are comprised.

Many strategies have been studied in order to speed up, or rather, increase the number of tablets which each transfer channel can manage in the unit of time. Indeed, systems are known for discharging the air, located in each transfer channel, in order to prevent the air present inside it from creating a stopper that slows down the advance of the tablet.

Fluidization systems are also known which work in the end part of the single transfer channel in order to more quickly free the exit of the tablets and facilitate their descent toward the organized containing means, thrusting them.

One drawback of known transfer channels is that with the current state of the art there is an insuperable limit of about 400 tablets per unit of time which each transfer channel manages to handle.

Moreover, the fluidization systems located at the exit must be calibrated very carefully, if the tablet is not to be emitted so fast that it comes out, for example, from the blister it is supposed to go in.

Document U.S. Pat. No. 7,516,836 describes a method and an apparatus to dispose individually objects such as pills, in packages with unitary or multiple doses.

One purpose of the present invention is to obtain a distributor unit in which each transfer channel is able to manage a larger number of tablets in the unit of time compared with known channels, to allow to increase productivity of the distributor unit itself.

Another purpose of the present invention is to obtain a distributor unit which is easy to produce and requires a reduced energy consumption, thus allowing to contain production and management costs.

Another purpose of the present invention is also to obtain a distributor unit which achieves a distribution of tablets able to prevent residues of the tablets, or associated to the tablets, when they arrive at the entrance of the transfer channel, from following the tablets along the channel.

Another purpose of the present invention is to make the tablets exit from the transfer channel at a speed such as to allow the exact positioning of the tablets inside the containing means, avoiding too high a speed which would preclude this operation.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, a distributor unit of tablets according to the present invention comprises a horizontal aligner channel cooperating with an effectively vertical transfer channel having an entrance zone. At least a first feed channel is associated to the entrance of the transfer channel and is able to deliver a first jet of gaseous fluid, which can be a jet of air or any other gaseous fluid suitable to the purpose, acting on the upper part of the tablets when they are positioned, or enter, in the entrance transitory of the transfer channel.

According to a variant, the jet of fluid is located to work frontally with respect to the direction of arrival of the tablets in the entrance transitory of the transfer channel.

In accordance with a variant embodiment, the entrance transitory of the transfer channel has a lead-in slide with an inclination of an angle comprised between 8° and 15°.

According to another variant, in the side opposite to the arrival of the tablets, the entrance transitory of the transfer channel has a front surface inclined with an inclination comprised between 8° and 15°.

In some forms of embodiment, one or more other feed channels can be provided with respect to the first feed channel, configured to deliver supplementary jets of gaseous fluid.

In accordance with variant embodiments, at least a second feed channel is located in proximity to the end of the entrance transitory of the transfer channel on the arrival side of the tablets, suitable to deliver a jet of fluid directed angled toward the exit of the tablets.

It is also a variant of the present invention to provide at least a third feed channel, able to deliver a third jet of fluid, alone or together with at least one of the first and second jets of fluid, behind with respect to the direction of arrival of the tablets to the transfer channel and located below the first feed channel.

Another variant provides that at least one of the jets of fluid is located in cooperation with the longitudinal axis of the transfer channel and is angled with respect to it.

The angle can go from about 1°, up to about 45°, and advantageously is comprised between about 8° and about 30°.

According to another variant, the feed channels can have a circular section, to deliver jets of fluid of a punctiform type.

It is also a variant to provide that the feed channels have a rectangular section, or lenticular section wider at the sides, to deliver jets of fluid respectively of the blade type with a constant section, or a variable section, able to surround the tablets in a bed of fluid.

According to some forms of embodiment of the invention, the jet of fluid, or one of the jets of fluid, can be the pulsating type.

It falls within the spirit of the invention to provide that at least a feed pipe cooperates with the feed channels to supply them with air, or other suitable gaseous fluid, the pressure of which is between 0.3 and 3.0 Bar, advantageously comprised between 0.8 and 2.0 Bar.

It also falls within the spirit of the invention to provide that the pressure of the gaseous fluid of the jet or jets is adjustable, for example individually for each jet or overall for all the jets of a feed channel.

It falls within the spirit of the invention to provide that other substances are added to the fluid delivered, or that it can be cooled or heated, depending on the type of tablet and/or the ambient temperature.

It falls within the spirit of a variant of the invention to provide that the aligner channel, able to align the tablets along an axis of feed and convey them to the transfer channel, has said lead-in slide cooperating with the entrance zone and which possibly connects with the latter by means of an entrance connector.

According to the invention, the lead-in slide, has an angle comprised between 8° and 15° with respect to the axis of feed.

It is a variant to provide that, at the front, in the entrance zone and in cooperation with the lead-in slide, the transfer channel has a connection inclination. The connection inclination may have an inclination comprised between 8° and 15° with respect to the axis of feed.

It is also a variant to provide that, in its upper part, both at the back, and possibly at the front, in cooperation with the entrance connector, the transfer channel has an inclination with respect to the longitudinal axis comprised between 8° and 15°.

The present invention also concerns a method to distribute tablets which provides to deliver at least a jet of gaseous fluid on the upper part of the tablets when they are positioned in the entrance transitory of an effectively vertical transfer channel, with an entrance zone and which cooperates with a horizontal aligner channel. The method of the present invention can, for example, be carried out with a distributor unit in accordance with forms of embodiment described here.

In variant embodiments, the method provides to make the tablets move along a lead-in slide of the entrance transitory of the transfer channel with an angle of inclination comprised between 8° and 15°.

In variant embodiments, the method can provide to deliver one or more supplementary jets of gaseous fluid.

In variant embodiments, one or more jets of fluid, primary and/or supplementary, are at a pressure between 0.3 and 3.0 Bar, advantageously comprised between 0.8 and 2.0 Bar.

BRIEF DESCRIPTION OF THE DRAWINGS

These and other characteristics of the present invention will become apparent from the following description of some forms of embodiment, given as a non-restrictive example with reference to the attached drawings wherein:

FIGS. 2 to 4 are section views of three possible variants of the inventive idea;

FIG. 5 is a plan and section view of two adjacent transfer channels;

FIG. 6 is a section of FIG. 5 from VI to VI.

In the following description, the same reference numbers are used for identical components that perform the same function.

Figure 1:
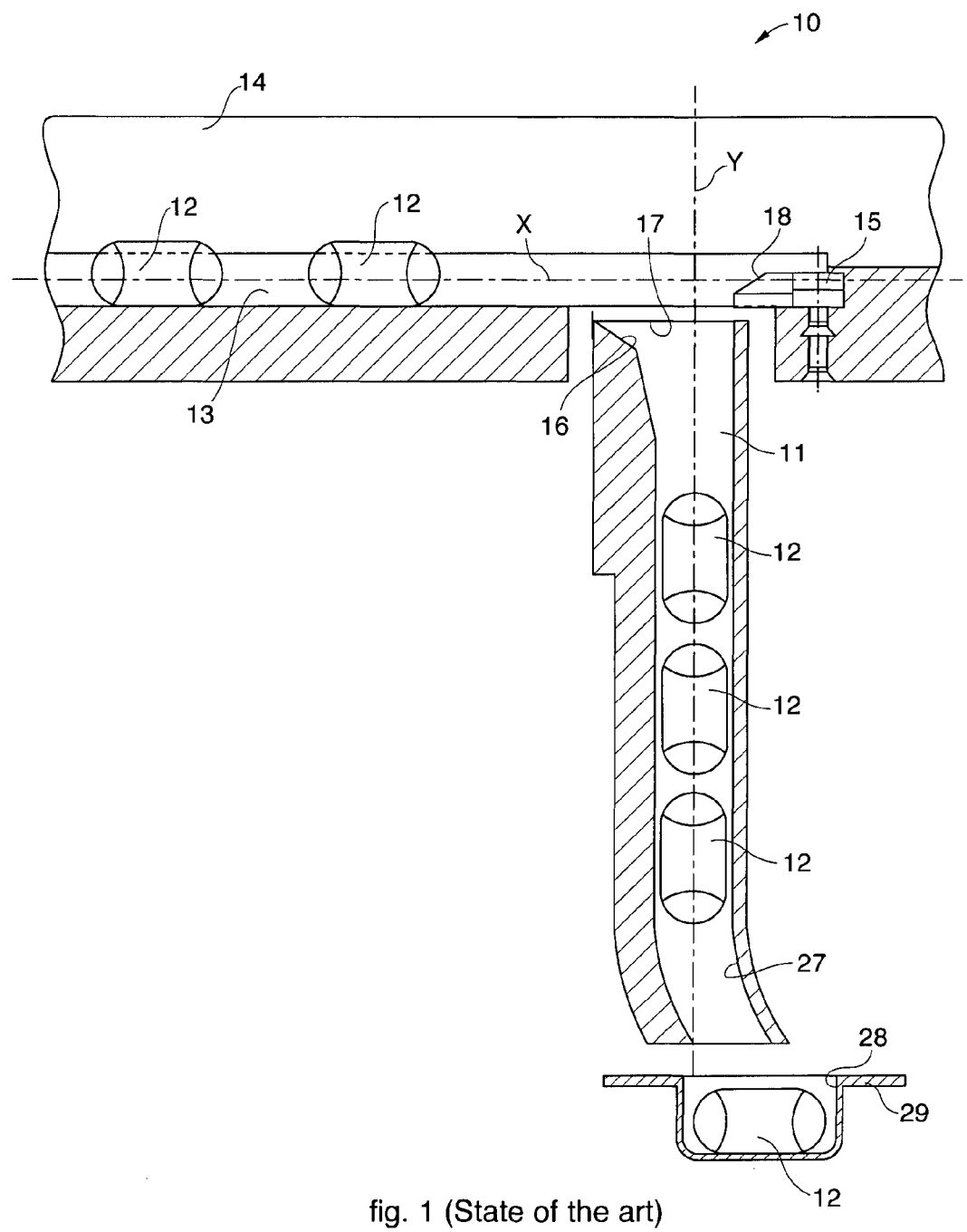
FIG. 1 is a section view of a known type of transfer channel associated to a diluting drum.

Moreover, in the drawings, the conformation of the end part of the transfer channels is purely indicative.

DESCRIPTION OF SOME FORMS OF EMBODIMENT

With reference to FIG. 1, in which an example of the state of the art is shown, a distributor unit 10 comprises a diluting drum 14 in which tablets 12 are introduced haphazardly.

From said diluting drum 14, in a known way, the tablets 12 are disposed aligned in a series of aligner channels 13, in this case substantially horizontal.

Inside the aligner channels 13 the tablets 12 move, along an axis of feed X, toward corresponding transfer channels 11, substantially vertical and having a longitudinal axis Y. Each transfer channel 11 has an entrance zone 17 able to channel the tablets 12 in single rows.

Figure 2:
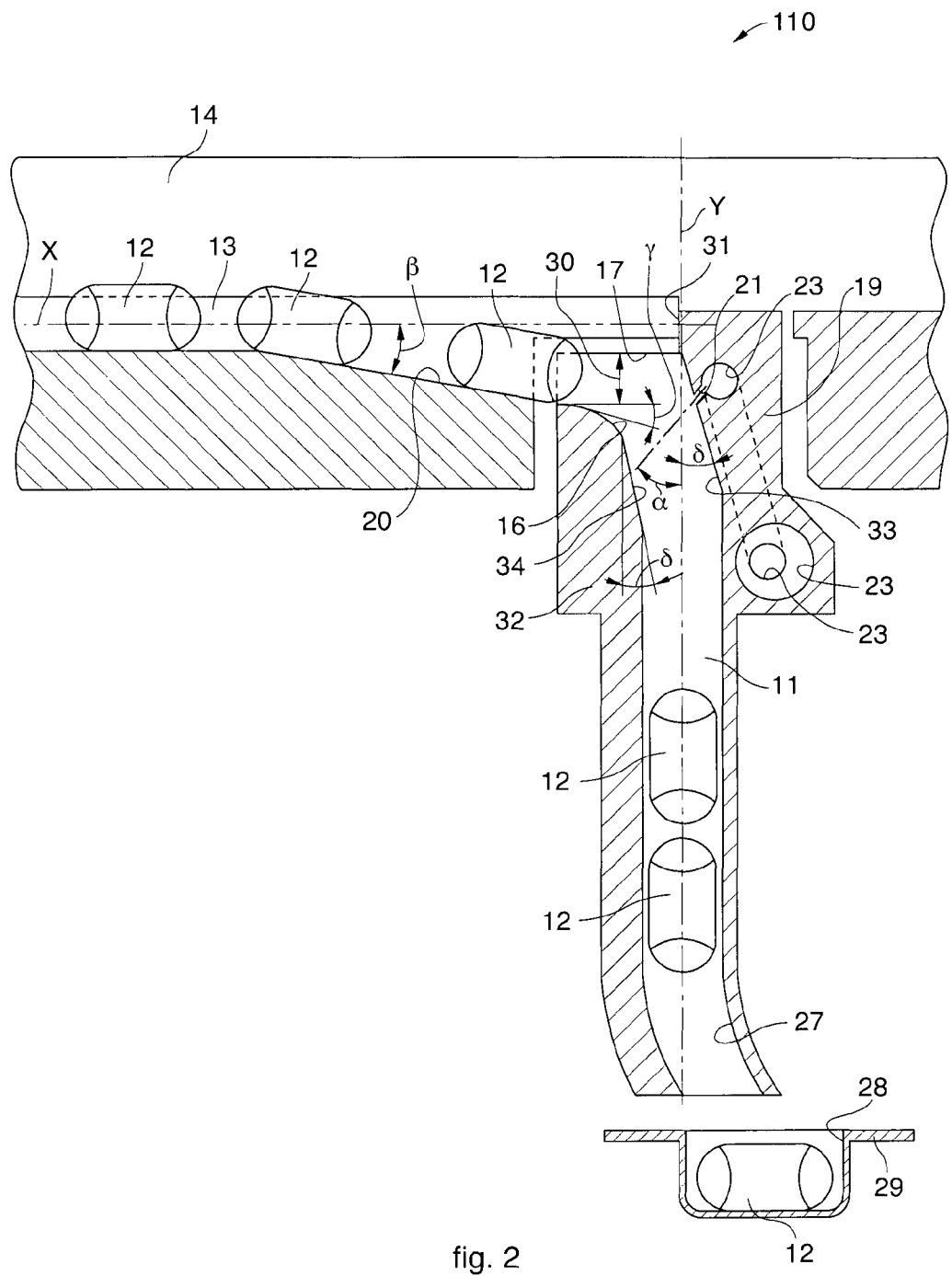

Moreover, an abutment and diversion element 15 is disposed downstream of the entrance zone 17 in order to return into circulation the surplus tablets 12 that knock against its front part 18. The abutment and diversion element 15 can be made moveable, as in FIG. 1, or in a single body with the diluting drum 14 (FIGS. 3 and 4) or with the transfer channel 11 (FIG. 2).

An entrance connector 16 between the aligner channel 13 and the corresponding transfer channel 11 is made in the entrance zone 17 to facilitate the change in direction of the tablets 12, which are thus disposed piled one on top of the other inside the transfer channel 11 and along its longitudinal axis Y, traveling along it from the entrance zone 17 to an exit zone 27, of a known type and only shown schematized here. In this way, the tablets 12 are gradually deposited in the final user device, which in this case is represented by a blister 28 of a blister strip 29. The final user device can be any type of intermediate or final containing or storage mean, positioned in proximity to the exit zone 27 of the transfer channel 11.

As indicated, the technology shown by way of example in FIG. 1 limits the quantity of tablets 12 transferred in the unit of time by the distributor unit 10 to the blister strip 29 or to the final user device.

According to the invention (FIGS. 2, 3 and 4) the entrance zone 17 is provided with bigger sizes compared with those described above. The front part 18 of the abutment and diversion element 15 is replaced at least in part by a raising 30 of the back wall 19 of the transfer channel 11 with respect to the entrance zone 17.

In one form of embodiment of the invention (FIG. 2) the front part 31 is replaced completely by the raising of the back wall 19 of the transfer channel 11.

In other forms of embodiment (FIGS. 3 and 4) the raising 30 and a shoulder 31 made in the diluting drum 14 above the back wall 19 fulfill this function. Other variant solutions come within the design philosophy expressed here.

In a first preferential form of embodiment of the invention, shown in FIG. 2, a distributor unit is indicated in its entirety by the reference number 110.

The distributor unit 110 comprises at least a back feed channel, or first feed channel 21, associated to the entrance of the transfer channel 11 and suitable to deliver a jet of gaseous fluid, acting on the upper part of the tablets 12 when these are positioned in the entrance transitory of the transfer channel 11. For example, the transfer channel 11 is made in the back wall 19 of the transfer channel 11.

In some forms of embodiment, the entrance transitory of the transfer channel 11 has the entrance connector 16 as cited above. For example, the entrance connector 16 can have a curvilinear conformation or in any case at least partly rounded off in a curve, for example with its convexity facing upward. For example, the surface of the entrance connector 16 can be defined essentially by a segment of an arc of a circle or similar shape.

In some forms of embodiment, the entrance connector 16 can be followed by an inclined plane or segment 34, with an inclination comprised between 8° and 15°.

In some forms of embodiment, on the side opposite the arrival of the tablets 12, the entrance transitory of the transfer channel 11 has a front surface 33 inclined by an angle δ comprised between 8° and 15°.

For example, the inclined plane or segment 34 can also be inclined by the same angle δ (for example indicated in FIG. 2). For example the inclined front surface 33 can be parallel to said inclined plane or segment 34.

The back feed channel 21 is able, for example, to deliver air under pressure, coming from a feed pipe 23, inside the entrance zone 17.

In the present description reference will be made to the delivery of air, but it is understood that the feed pipe 23 and the feed channels can also deliver any other type of gaseous fluid suitable for the purpose.

In the case shown here, the back feed pipe 21 is inclined with respect to the longitudinal axis Y of the transfer channel 11 by an angle α equal to about 15°. In this way, the feed channel 21 cooperates with the front part of the tablets 12, facilitating their entrance into the transfer channel 11 when they are in the entrance zone 17.

In a second form of embodiment (FIG. 3), in which a distributor unit is indicated by the reference number 210, in the front wall 32 of the transfer channel 11 a front feed channel is made, or third feed channel 24, situated in a more internal position inside the transfer channel 11 with respect to the back feed channel 21. The function of the front feed channel 24 is to cooperate with the back feed channel 21 to create a cushion of air which, contrasting the friction between the tablets 12 and the transfer channel 11, acts as a fluidifying mean and facilitates the advance of the tablets 12.

In another form of embodiment (FIG. 4) of the distributor unit, indicated by the reference number 310, the back feed channel 21 is not made in the solid part of the unit (FIGS. 2 and 3), but is defined by a panel 22 and by the upper part of the back wall 19 of the transfer channel 11. The panel 22 is attached to the top part of the back wall 19 and is conformed to partially protrude inside the entrance zone 17 and divert the air coming from the feed pipe 23, in this specific case making it substantially parallel to the longitudinal axis Y. In this way, a feed pipe 23 can serve simultaneously both the back feed channel 21 and a secondary feed channel, or second feed channel 25. In some forms of embodiment, the secondary feed channel 25 is located in proximity to the end of the entrance transitory of the transfer channel 11 on the side where the tablets 12 arrive and is suitable to deliver a jet of fluid directed angled toward the exit of the tablets 12. For example, the secondary feed channel 25 is positioned in the back wall 19 more internally inside the transfer channel 11 compared with the back feed channel 21.

The invention also provides the possibility that there are more than one back 21 and front 24 feed channels for each wall of the transfer channel 11.

Moreover, there can also be feed channels disposed on the sides of the transfer channel 11.

According to the invention, other secondary feed channels 25 can be provided in cooperation with the back wall 19 and/or with the sides of the transfer channel 11.

In some forms of embodiment, one or more of the feed channels 21, 24, 25 can be configured so that at least one of the jets of fluid is put in cooperation with the longitudinal axis Y of the transfer channel 11 and has an angle with respect thereto which can go for example from about 1° up to about 45°, and is advantageously comprised between about 8° and about 30°.

In some forms of embodiment, the feed channels 21, 24, 25 can be punctiform (on the left in FIG. 5), that is, they have a section corresponding to a hole with sizes mating with the delivery pressure and/or with the physical and geometrical characteristics of the tablets 12.

According to a variant (on the right in FIG. 5 and in FIG. 6), the feed channels 21, 24, 25 can have a rectangular blade section, as indicated in this case for the feed channels 121a of the transfer channel 11a. They can also have a lenticular section, as indicated for the feed channels 121b of the transfer channel 11b, in which the delivery of air is greater at the sides of the feed channel, in order to create a fluid flow surrounding the tablets 12.

In the same variant, venting cavities 26 are shown, merely by way of example, which allow to eliminate the excess air in the transfer channels 11a, 11b. The venting cavities 26 can also be present in all the variants described previously and can be of any shape, size or disposition.

Figure 3:
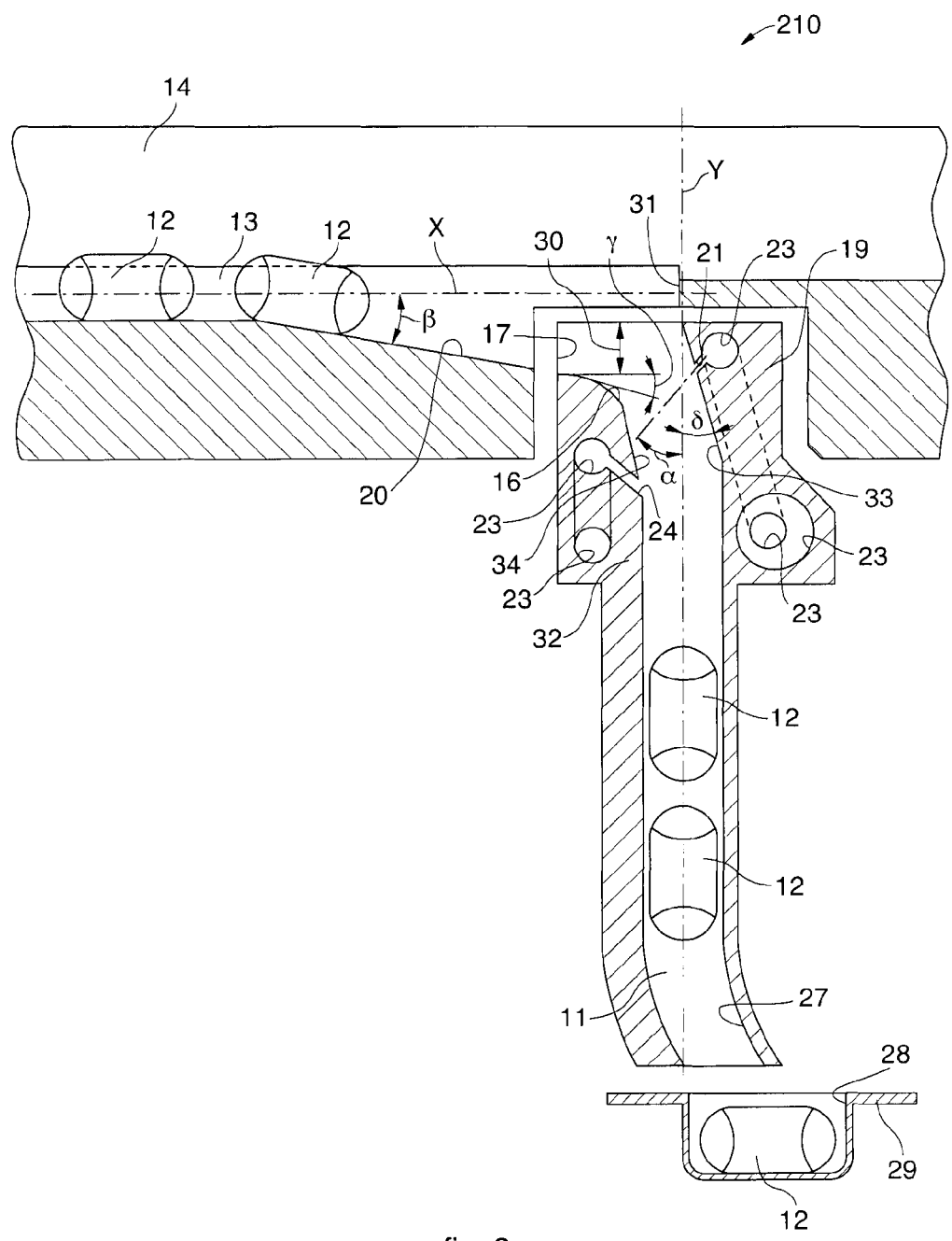

With reference to FIGS. 2, 3 and 4, the invention provides that the upper part of the back wall 19 and front wall 32 of the transfer channel 11 is inclined. Moreover, the entrance connector 16 is made in the front wall 32.

In some forms of embodiment, the entrance transitory of the transfer channel 11 has a lead-in slide 20 with an inclination of an angle β comprised between 8° and 15°. The function of the entrance connector 16 is to connect the transfer channel 11 to the lead-in slide 20 of the aligner channel 13. In the case shown here, in proximity to the entrance zone 17 the lead-in slide 20 is inclined, in this case, by an angle β comprised between 8° and 15°, advantageously about 10° for example, with respect to the axis of feed X. In this way, each tablet 12 arrives at the entrance zone 17 in an inclined position, therefore more favorable, and therefore its entrance into the transfer channel 11 is facilitated.

Its entrance is even more facilitated by the fact that the end of the entrance connector 16, which connects the entrance zone 17 and the lead-in slide 20, is inclined, with respect to the axis of feed X, by an angle γ approximately equal to the angle β.

Moreover, the correct conveyance of the tablets 12 along the transfer channel 11 is promoted by the inclination of the inclined front surface 33 of the back wall 19. The front surface 33 is in fact inclined with respect to the longitudinal axis Y of the transfer channel 11 by an angle δ (FIGS. 2-4) approximately equal to angle β, for example comprised between 8° and 15°.

It is also provided that the transfer channel 11 has the quoted inclined plane or segment 34, positioned between the entrance connector 16 and the next part of the transfer channel 11, lying on a plane inclined by an angle approximately equal to the angle δ, for example comprised between 8° and 15°.

It is clear that modifications and/or additions of parts may be made to the distributor unit as described heretofore, without departing from the field and scope of the present invention.

It is also clear that, although the present invention has been described with reference to some specific examples, a person of skill in the art shall certainly be able to achieve many other equivalent forms of distributor unit, having the characteristics as set forth in the claims and hence all coming within the field of protection defined thereby.

The invention claimed is:
1. A distributor unit suitable to distribute tablets comprising:
   a horizontal aligner channel cooperating with an effectively vertical transfer channel, and the transfer channel having an entrance zone; and
   an entrance transitory of the transfer channel, the entrance transitory having a lead-in slide with an inclination with respect to an axis of feed along which the horizontal aligner lies and a longitudinal axis of the transfer channel, wherein at least a first feed channel is associated to the entrance zone and is suitable to deliver a jet of gaseous fluid, acting on an upper part of the tablets when they are positioned in the entrance transitory of the transfer channel, wherein at least a further feed channel is located in proximity to the entrance zone, behind with respect to the direction of arrival of the tablets in the transfer channel, and is suitable to deliver a further jet of gaseous fluid directed in cooperation with the tablets.

2. The distributor unit as in claim 1, wherein the first feed channel is positioned in correspondence to the entrance zone, in the front part with respect to the direction of arrival of the tablets in the entrance transitory of the transfer channel.

3. The distributor unit as in claim 1, wherein the lead-in slide has an angle of inclination comprised between 8° and 15°.

4. The distributor unit as in claim 1, wherein the entrance transitory of the transfer channel has an entrance connector followed by an inclined plane or segment with an inclination comprised between 8° and 15°.

5. The distributor unit as in claim 1, wherein in the side opposite to the arrival of the tablets, the entrance transitory of the transfer channel has a front surface inclined with an inclination comprised between 8° and 15°.

6. The distributor unit as in claim 1, wherein at least a second feed channel is located in proximity to the end of the entrance transitory of the transfer channel on the side where the tablets arrive and is suitable to deliver a jet of fluid in an angled direction toward the exit of the tablets.

7. The distributor unit as in claim 6, wherein the first and second feed channels are fed with air, the pressure of which is between 0.3 and 3.0 Bar.

8. The distributor unit as in claim 1, wherein the pressure of at least one of the first or the further feed channels is adjustable.

9. The distributor unit as in claim 1, wherein the pressure of at least one of the first, a second, or the further feed channels is pulsating.

10. The distributor unit as in claim 1, wherein the aligner channel is able to align the tablets along the axis of feed, wherein the aligner channel is associated to the lead-in slide, inclined with respect to the axis of feed and cooperating with the entrance zone of the transfer channel, and in that the entrance connector is made in correspondence to said entrance zone to connect the lead-in slide to the entrance zone.

11. The distributor unit as in claim 10, wherein the angle of the lead-in slide with respect to the axis of feed is comprised between 8° and 15°.

12. The distributor unit as in claim 10, wherein the entrance connector has an entrance angled with respect to the axis of feed by an angle comprised between 8° and 15°.

13. The distributor unit as in claim 12, wherein the entrance connector connects to the transfer channel through a plane, inclined with respect to the longitudinal axis of the transfer channel by an angle comprised between 8° and 15°.

14. The distributor unit as in claim 5, wherein, behind and in cooperation with the entrance zone, the transfer channel has the front surface, inclined with respect to a longitudinal axis of the transfer channel by an angle comprised between 8° and 15°.

15. A method to distribute tablets using a distributor unit, the distributor unit including a horizontal aligner channel cooperating with an effectively vertical transfer channel, and the transfer channel having an entrance zone and an entrance transitory, the entrance transitory having a lead-in slide with an inclination with respect to an axis of feed along which the horizontal aligner lies and a longitudinal axis of the transfer channel, the method comprising:

delivering a jet of gaseous fluid via a first feed channel associated to the entrance zone and acting on an upper part of a tablet when the tablet is positioned in the entrance transitory of the transfer channel;

moving the tablet along the entrance transitory of the transfer channel;

facilitating the tablet into the transfer channel via the lead-in slide; and delivering a further jet of gaseous fluid directed in cooperation with the tablet via a further feed channel located in proximity to the entrance zone, behind with respect to a direction of arrival of the tablet in the transfer channel.

* * * * *